US012621306B1

(12) United States Patent
Agrawal et al.

(10) Patent No.: US 12,621,306 B1
(45) Date of Patent: May 5, 2026

(54) PROVIDING SECURE ACCESS TO AN ORGANIZATION FOR SUPPORT AND PARTNER MANAGEMENT

(71) Applicant: Juniper Networks, Inc., Sunnyvale, CA (US)

(72) Inventors: Akash Agrawal, Gwalior (IN); Ramesh Ramanathapuram Neelakantan, Bangalore (IN); Sanjeev Kumar Mishra, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 78 days.

(21) Appl. No.: 18/583,051

(22) Filed: Feb. 21, 2024

(51) Int. Cl.
*H04L 9/40* (2022.01)

(52) U.S. Cl.
CPC ............ *H04L 63/105* (2013.01); *H04L 63/08* (2013.01); *H04L 63/108* (2013.01)

(58) Field of Classification Search
None
See application file for complete search history.

(56) References Cited

U.S. PATENT DOCUMENTS

| | | | |
|---|---|---|---|
| 8,769,704 B2 | 7/2014 | Peddada et al. | |
| 10,270,741 B2 | 4/2019 | Burch et al. | |

| | | | | |
|---|---|---|---|---|
| 2014/0336795 | A1* | 11/2014 | Asenjo | G05B 19/4083 700/86 |
| 2018/0063080 | A1* | 3/2018 | Lehmann | H04L 41/28 |
| 2019/0215319 | A1* | 7/2019 | Hu | G06F 21/30 |
| 2022/0337596 | A1 | 10/2022 | Smith et al. | |

FOREIGN PATENT DOCUMENTS

| | | |
|---|---|---|
| DE | 102015003236 A1 | 9/2015 |

OTHER PUBLICATIONS

Greenwood et al., "Managing temporary elevated access to your AWS environment," AWS Security Blog, Website: https://aws.amazon.com/blogs/security/managing-temporary-elevated-access-to-your-aws-environment/, Nov. 12, 2021, 18 Pages.

* cited by examiner

*Primary Examiner* — Brandon Hoffman

(74) *Attorney, Agent, or Firm* — Harrity & Harrity, LLP

(57) ABSTRACT

A device may receive, from an organization user, a request for support associated with a cloud computing environment utilized by the organization user, and may provide the request for support to a support user. The device may receive, from the support user, credentials of the support user and a login request to access the cloud computing environment, and may determine whether the credentials of the support user satisfy a domain check, a virtual private network (VPN) check, a role check, and a secure group check. The device may selectively deny the login request based on the credentials failing to satisfy one or more of the domain check, the VPN check, the role check, or the secure group check, or may approve the login request based on the credentials satisfying the domain check, the VPN check, the role check, and the secure group check.

20 Claims, 8 Drawing Sheets

400 ⟶

410 ⟶ Receive, from an organization user, a request for support associated with a cloud computing environment utilized by the organization user 420 ⟶ Provide the request for support to a support user 430 ⟶ Receive, from the support user, credentials of the support user and a login request to access the cloud computing environment 440 ⟶ Determine whether the credentials of the support user satisfy a domain check, a virtual private network (VPN) check, a role check, and a secure group check 450 ⟶ Selectively deny the login request based on the credentials failing to satisfy one or more of the domain check, the VPN check, the role check, or the secure group check, or approve the login request based on the credentials satisfying the domain check, the VPN check, the role check, and the secure group check

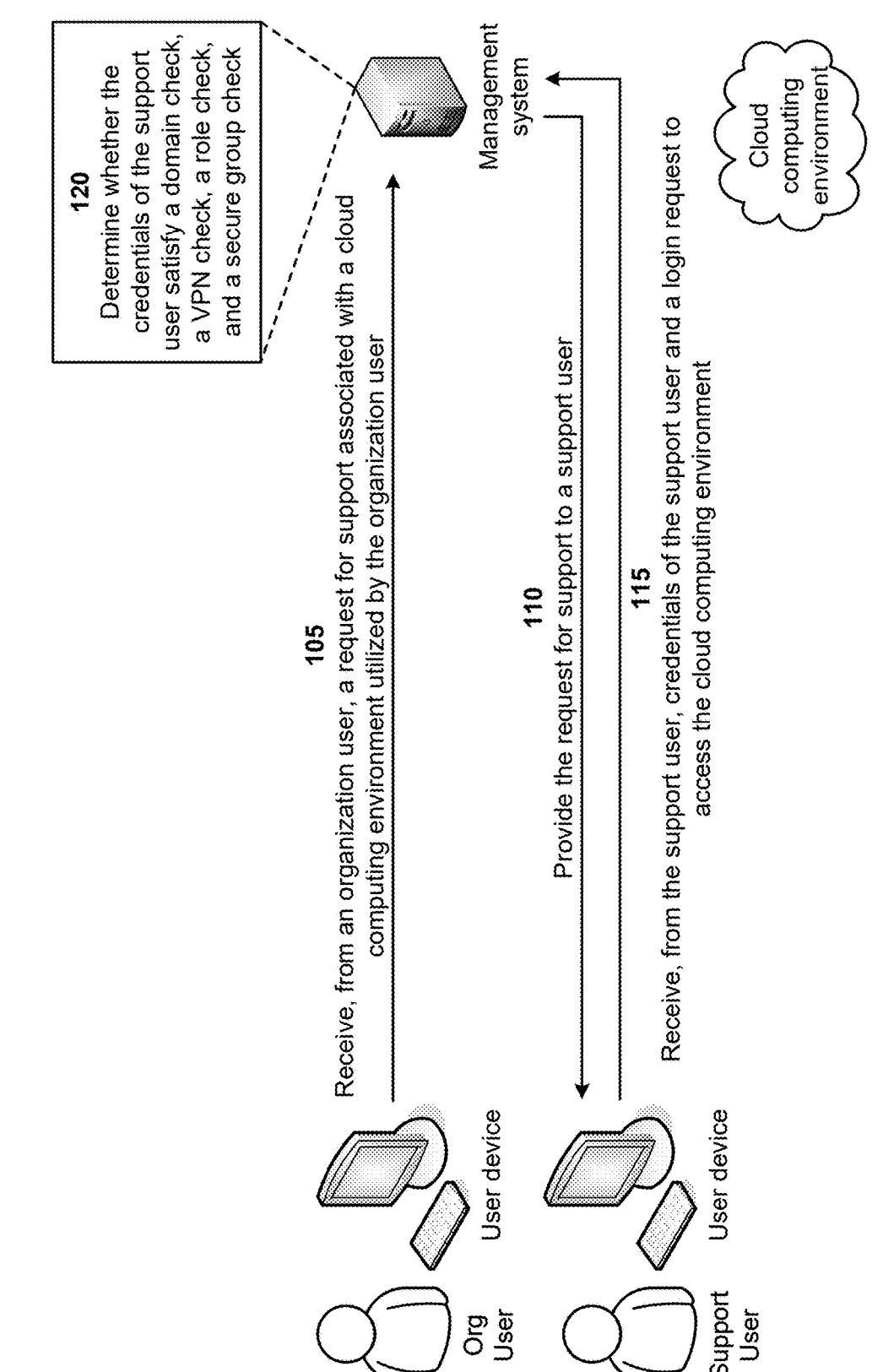

120

Determine whether the credentials of the support user satisfy a domain check, a VPN check, a role check, and a secure group check Management system Cloud computing environment

105

Receive, from an organization user, a request for support associated with a cloud computing environment utilized by the organization user

110

Provide the request for support to a support user

115

Receive, from the support user, credentials of the support user and a login request to access the cloud computing environment Org User User device Support User User device

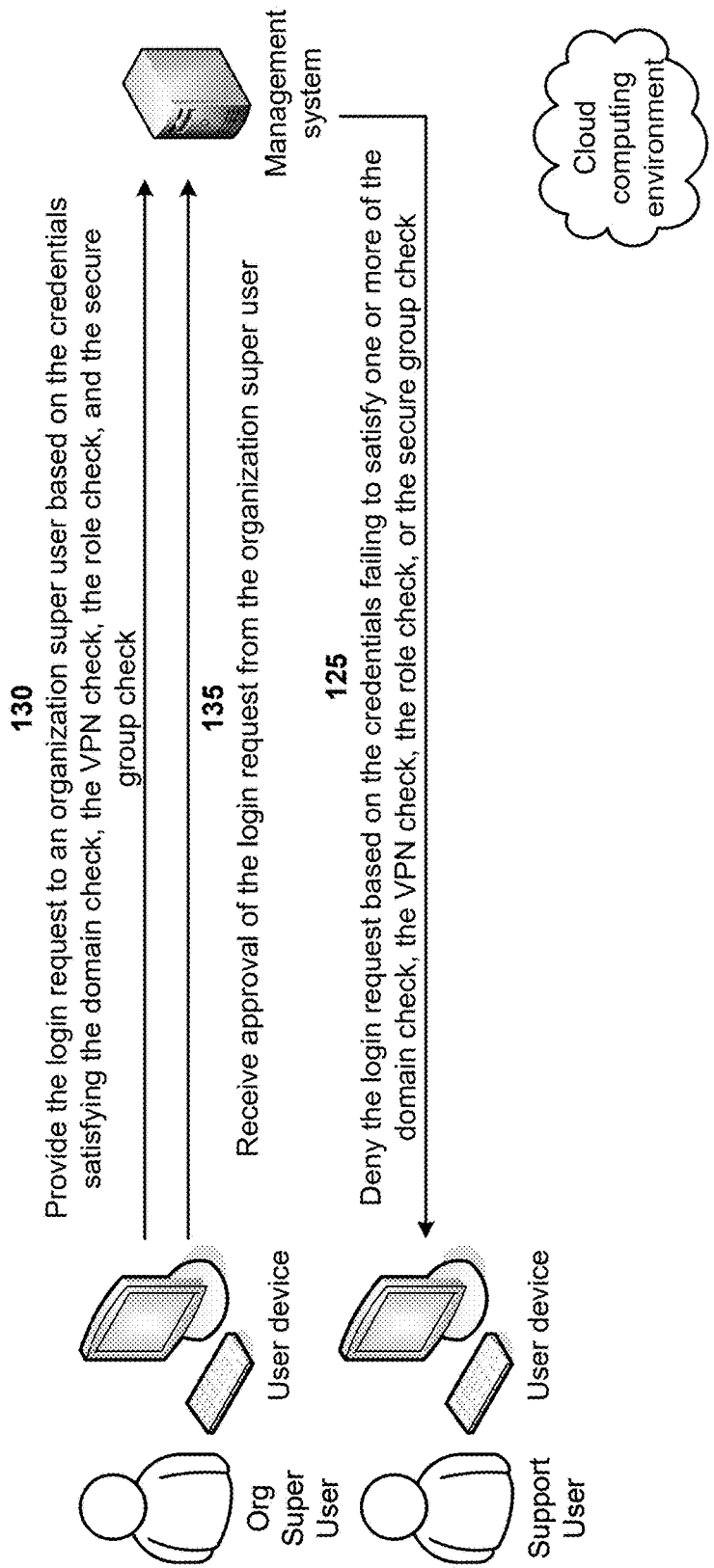

130
Provide the login request to an organization super user based on the credentials satisfying the domain check, the VPN check, the role check, and the secure group check

135
Receive approval of the login request from the organization super user

125
Deny the login request based on the credentials failing to satisfy one or more of the domain check, the VPN check, the role check, or the secure group check Management system Cloud computing environment User device Org Super User User device Support User

FIG. 1B

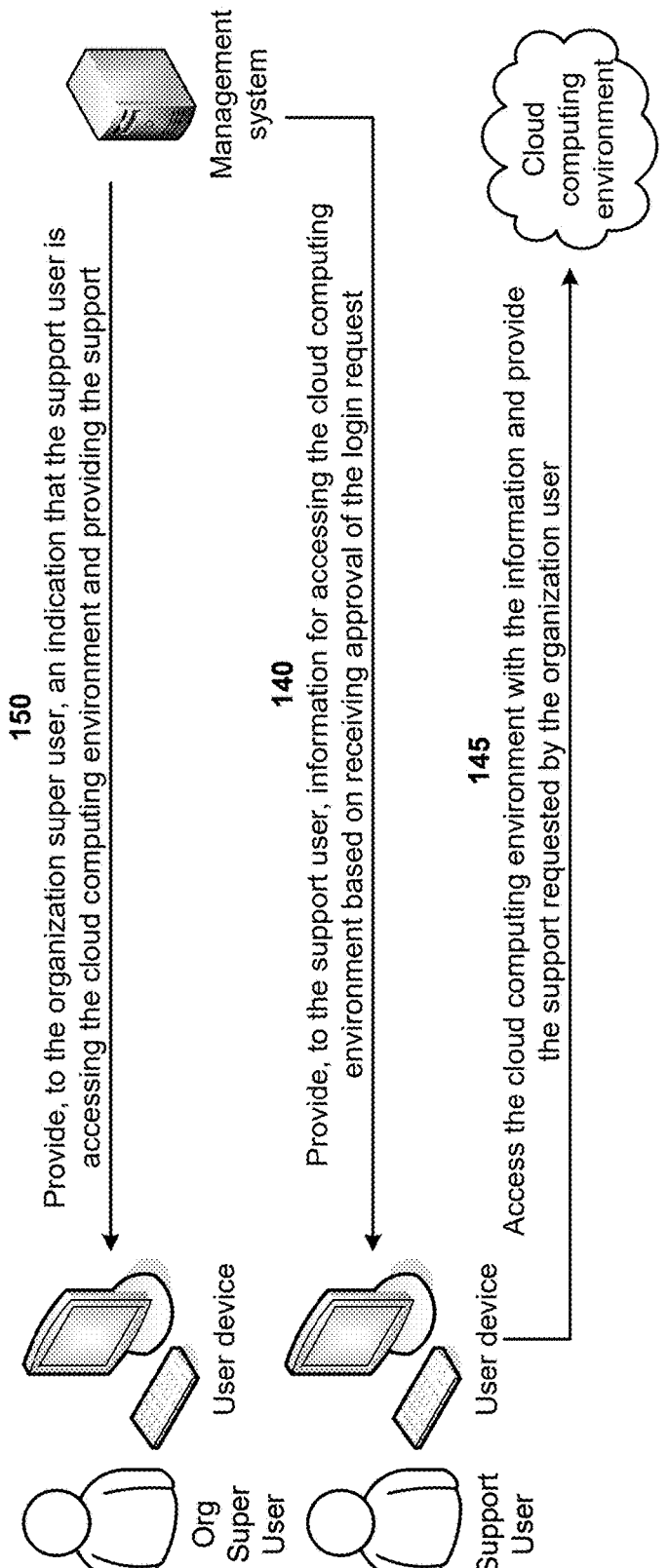

150
Provide, to the organization super user, an indication that the support user is accessing the cloud computing environment and providing the support Management system

140
Provide, to the support user, information for accessing the cloud computing environment based on receiving approval of the login request

145
Access the cloud computing environment with the information and provide the support requested by the organization user Cloud computing environment User device Org Super User User device Support User

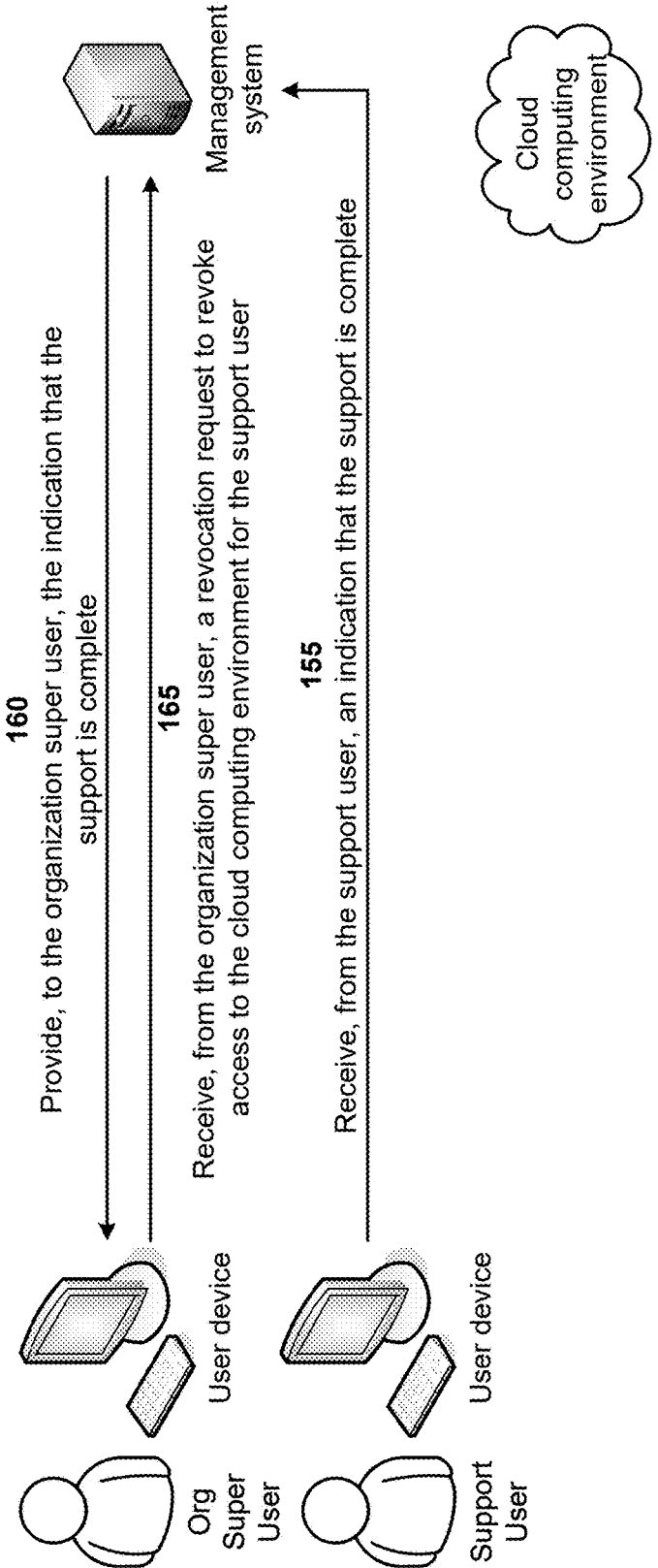

100

160
Provide, to the organization super user, the indication that the support is complete 165
Receive, from the organization super user, a revocation request to revoke access to the cloud computing environment for the support user 155
Receive, from the support user, an indication that the support is complete Management system Cloud computing environment User device Org Super User User device Support User

Revoke, based on the revocation request, access to the cloud computing environment for the support user Management system Cloud computing environment Org Super User User device Support User User device

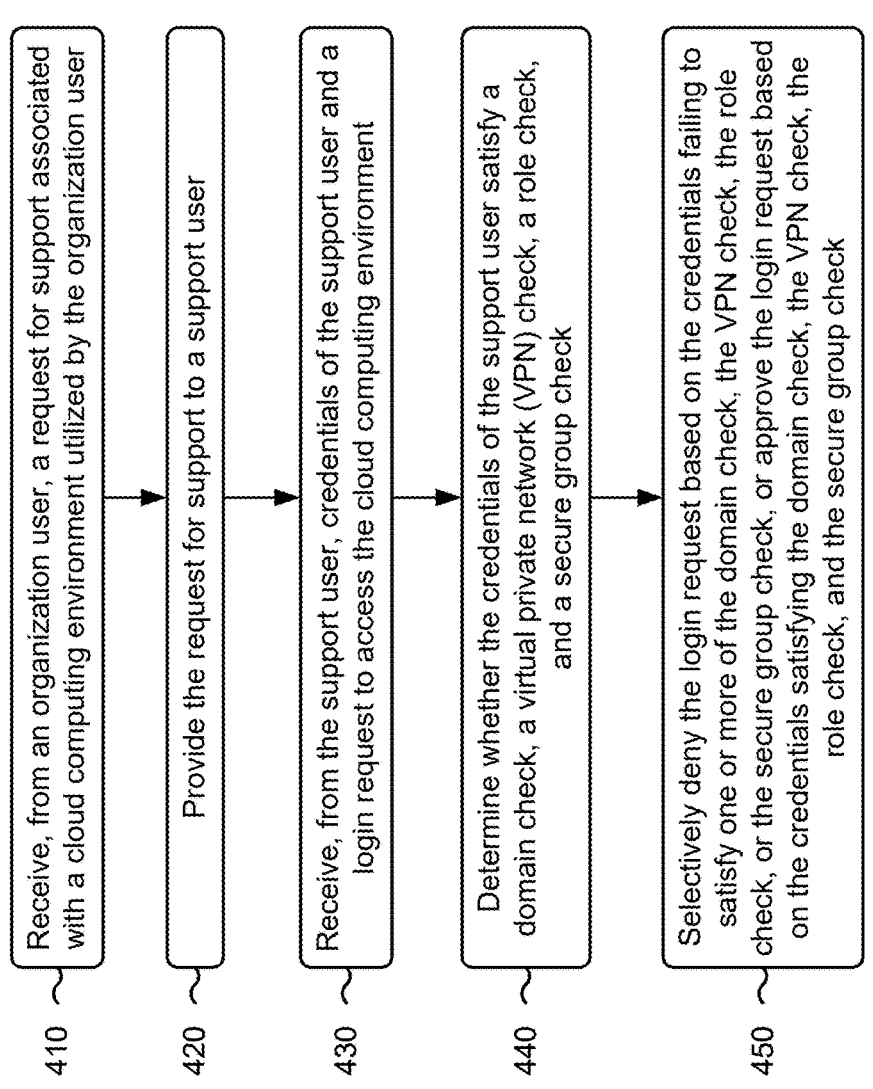

410 Receive, from an organization user, a request for support associated with a cloud computing environment utilized by the organization user 420 Provide the request for support to a support user 430 Receive, from the support user, credentials of the support user and a login request to access the cloud computing environment 440 Determine whether the credentials of the support user satisfy a domain check, a virtual private network (VPN) check, a role check, and a secure group check 450 Selectively deny the login request based on the credentials failing to satisfy one or more of the domain check, the VPN check, the role check, or the secure group check, or approve the login request based on the credentials satisfying the domain check, the VPN check, the role check, and the secure group check

PROVIDING SECURE ACCESS TO AN ORGANIZATION FOR SUPPORT AND PARTNER MANAGEMENT

BACKGROUND

While many cloud computing environments attempt to eliminate a need for human access, there often remain cases where human access is required. For example, unexpected issues might require human intervention to diagnose or fix, or legacy technologies of a cloud computing environment may require manual configuration.

SUMMARY

Some implementations described herein relate to a method. The method may include receiving, from an organization user, a request for support associated with a cloud computing environment utilized by the organization user, and providing the request for support to a support user. The method may include receiving, from the support user, credentials of the support user and a login request to access the cloud computing environment, and determining whether the credentials of the support user satisfy a domain check, a virtual private network (VPN) check, a role check, and a secure group check. The method may include selectively denying the login request based on the credentials failing to satisfy one or more of the domain check, the VPN check, the role check, or the secure group check, or approving the login request based on the credentials satisfying the domain check, the VPN check, the role check, and the secure group check.

Some implementations described herein relate to a device. The device may include one or more memories and one or more processors. The one or more processors may be configured to receive, from an organization user, a request for support associated with a cloud computing environment utilized by the organization user, and provide the request for support to a support user. The one or more processors may be configured to receive, from the support user, credentials of the support user and a login request to access the cloud computing environment, and determine whether the credentials of the support user satisfy a domain check, a VPN check, a role check, and a secure group check. The one or more processors may be configured to selectively deny the login request and access of the support user to the cloud computing environment based on the credentials failing to satisfy one or more of the domain check, the VPN check, the role check, or the secure group check, or approve the login request based on the credentials satisfying the domain check, the VPN check, the role check, and the secure group check.

Some implementations described herein relate to a non-transitory computer-readable medium that stores a set of instructions. The set of instructions, when executed by one or more processors of a device, may cause the device to receive, from an organization user, a request for support associated with a cloud computing environment utilized by the organization user, wherein the request for support includes information identifying one or more of an identifier of an organization, a name of the organization, a target device identifier, or a cloud resource identifier. The set of instructions, when executed by one or more processors of the device, may cause the device to provide the request for support to a support user, and receive, from the support user, credentials of the support user and a login request to access the cloud computing environment. The set of instructions, when executed by one or more processors of the device, may cause the device to determine whether the credentials of the support user satisfy a domain check, a VPN check, a role check, and a secure group check. The set of instructions, when executed by one or more processors of the device, may cause the device to selectively deny the login request based on the credentials failing to satisfy one or more of the domain check, the VPN check, the role check, or the secure group check, or approve the login request based on the credentials satisfying the domain check, the VPN check, the role check, and the secure group check.

BRIEF DESCRIPTION OF THE DRAWINGS

FIGS. 1A-1E are diagrams of an example associated with providing secure access to an organization for support and partner management.

FIG. 4 is a flowchart of an example process for providing secure access to an organization for support and partner management.

DETAILED DESCRIPTION

Figure 1E:
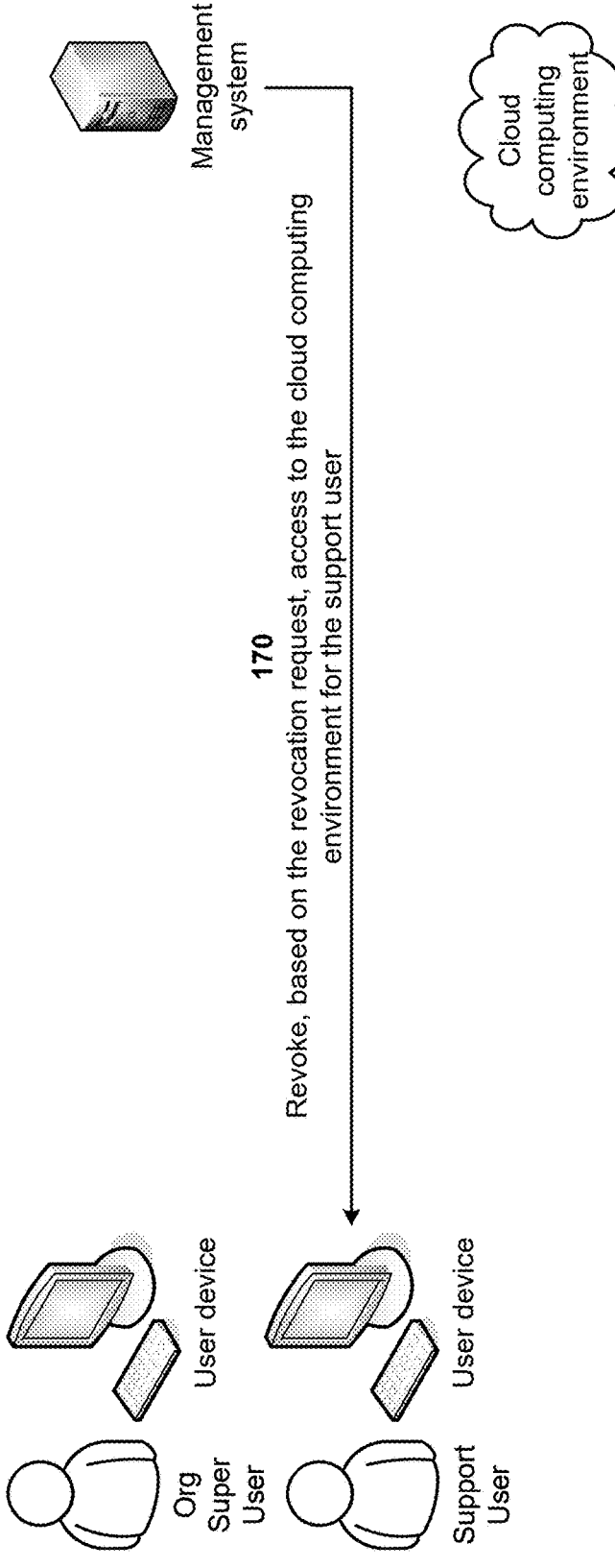

The following detailed description of example implementations refers to the accompanying drawings. The same reference numbers in different drawings may identify the same or similar elements.

For higher-risk human access scenarios, an organization utilizing a cloud computing environment may enable access to the cloud computing environment by implementing temporary elevated access. A goal of temporary elevated access is to ensure that each time a user invokes access to the cloud computing environment, there is an appropriate business reason for the access (e.g., to correct a specific issue or deploy a change). With temporary elevated access, a user must be authenticated and authorized for access to the cloud computing environment, but also must identify and record a legitimate business reason for invoking access to the cloud computing environment. When access is granted, the user is only granted access if the business reason is appropriate, and a scope and a duration of the access is aligned to the business reason. The user is provided a timebound elevated access, as per policies, for the cloud computing environment.

Thus, current techniques for providing access to a cloud computing environment provide bad actors with access to the cloud computing environment, incorrectly identify a legitimate business reason for temporary access to the cloud computing environment, incorrectly providing temporary access to the cloud computing environment based on an illegitimate business reason, and fail to provide an audit trail and additional security to the temporary access to the cloud computing environment. Therefore, the current techniques consume computing resources (e.g., processing resources, memory resources, communication resources, and/or the like), networking resources, and/or the like, associated with providing bad actors with access to the cloud computing environment, incorrectly identifying a legitimate business reason for temporary access to the cloud computing environment, incorrectly providing temporary access to the cloud computing environment based on an illegitimate business reason, failing to provide an audit trail and additional security to the temporary access to the cloud computing environment, and/or the like.

Some implementations described herein relate to a device (e.g., a management system) that provides secure access to an organization for support and partner management. For example, the management system may receive, from an organization user, a request for support associated with a cloud computing environment utilized by the organization user, and may provide the request for support to a support user. The management system may receive, from the support user, credentials of the support user and a login request to access the cloud computing environment, and may determine whether the credentials of the support user satisfy a domain check, a virtual private network (VPN) check, a role check, and a secure group check. The management system may selectively deny the login request based on the credentials failing to satisfy one or more of the domain check, the VPN check, the role check, or the secure group check, or may approve the login request based on the credentials satisfying the domain check, the VPN check, the role check, and the secure group check.

In this way, the management system provides secure access to an organization for support and partner management. For example, the management system may provide a support user with access to an organization's cloud computing environment in a secure and efficient manner for managed partner support. The management system may enable the support user to temporarily provide support for a service (e.g., software as a service (SaaS) solutions) associated with the organization. The management system may provide a complete audit trail of support users that access the cloud computing environment, and may provide a combination of integrated checks and workflow to ensure that access to the cloud computing environment is validated by the organization and appropriate for a support user. The management system may perform a check based on a combination of security features (e.g., a domain check, a role check, a virtual private network (VPN) check, a secure group check, and/or the like) to prevent unauthorized access due to a role change. Thus, the management system conserves computing resources, networking resources, and/or the like that would otherwise have been consumed by providing bad actors with access to a cloud computing environment, incorrectly identifying a legitimate business reason for temporary access to the cloud computing environment, incorrectly providing temporary access to the cloud computing environment based on an illegitimate business reason, failing to provide an audit trail and additional security to the temporary access to the cloud computing environment, and/or the like.

FIGS. 1A-1E are diagrams of an example 100 associated with providing secure access to an organization for support and partner management. As shown in FIGS. 1A-1E, example 100 includes user devices associated with an organization user, a support user, or an organization super user, a cloud computing environment, and a management system. An organization associated with the organization user, the organization super user, and the management system may operate or have access to the cloud computing environment. The organization user may include a user that generates a support case for the support user to handle. The support user may not be associated with the organization but may provide support for the cloud computing environment when granted access to the cloud computing environment. The organization super user may include a user that manages operations of the organization, and that provides approval for the support user to access the cloud computing environment. Further details of the user devices, the organization user, the support user, the organization super user, the cloud computing environment, and the management system are provided elsewhere herein.

In some implementations, the organization user and the organization super user may access and/or communicate with the management system via a first user interface (e.g., a first portal) associated with the organization and/or the cloud computing environment. In some implementations, the support user may access and/or communicate with the management system via a second user interface (e.g., a second portal) associated with a support service provider. The first portal may be different than and separate from the second portal. The support user may generate a request at the second portal, which is within the control of the support service provider and may be provided by a device associated with the service provider. The request may be checked based on service provider policy and, based on successfully passing through these checks, may be forwarded to the organization. The organization (e.g., via the first portal) may apply checks to the request based on organization policy (e.g., an identity check, an access level check, a valid business case check, and/or the like) and may present the request for approval to the organization super user.

As shown in FIG. 1A, and by reference number 105, the management system may receive, from an organization user, a request for support associated with a cloud computing environment utilized by the organization user. For example, the organization user may require support associated with the cloud computing environment, and may cause the user device to generate the request for support associated with the cloud computing environment. The organization user may cause the user device to provide the request for support associated with the cloud computing environment to the management system, and the management system may receive the request for support associated with the cloud computing environment from the user device associated with the organization user. In some implementations, the organization user may utilize the user device to access a portal provided by the management system, and may submit the request for support via the portal (e.g., by opening a support case via the portal).

In some implementations, the request for support may include a request for executing a specific set of commands in the cloud computing environment, a request for accessing a specific resource (e.g., a data center server, a network device, data center storage, and/or the like) of the cloud computing environment, and/or the like. In some implementations, the request for support may include an organization identification (ID) of the organization user, a name of the organization, an identification of a target resource (e.g., a data center server, a network device, data center storage, and/or the like), an identification of the cloud computing environment, and/or the like.

As further shown in FIG. 1A, and by reference number 110, the management system may provide the request for support to a support user. For example, the management system may provide the request for support to the user device associated with the support user. The user device associated with the support user may display the request for support to the support user. In some implementations, the management system may generate a notification (e.g., via a text message, an email message, the portal, and/or the like) based on the request for support, and may provide the notification to the user device associated with the support user. The user device may display the notification to the support user. In some implementations, the support user may utilize the user device to access the portal provided by the management system based on the notification, and may retrieve the request for support via the portal (e.g., by viewing the support case opened by the organization user via the portal).

As further shown in FIG. 1A, and by reference number 115, the management system may receive, from the support user, credentials of the support user and a login request to access the cloud computing environment. For example, the support user may utilize the user device to provide the credentials of the support user, the login request to access the cloud computing environment, and the request for support. The user device associated with the support user may provide the credentials of the support user, the login request, and the request for support to the management system, and the management system may receive the credentials of the support user, the login request, and the request for support from the user device associated with the support user. In some implementations, the credentials may include information identifying a domain associated with the support user (e.g., an email address of the support user), a VPN utilized by the support user, a role associated with the support user, a secure group associated with the support user (e.g., a group with access rights to the cloud computing environment), and/or the like.

As further shown in FIG. 1A, and by reference number 120, the management system may determine whether the credentials of the support user satisfy a domain check, a VPN check, a role check, and a secure group check. For example, the management system may determine whether the domain associated with the support user corresponds to a domain approved to access the cloud computing environment (e.g., satisfies a domain check). The management system may determine whether the VPN utilized by the support user corresponds to a VPN approved to access the cloud computing environment (e.g., satisfies a VPN check). The management system may determine whether the role associated with the support user corresponds to a role approved to access the cloud computing environment (e.g., satisfies a role check). The management system may determine whether the secure group associated with the support user corresponds to a secure group approved to access the cloud computing environment (e.g., satisfies a secure group check). In some implementations, the management system may determine that the credentials of the support user satisfy the domain check, the VPN check, the role check, and the secure group check. Alternatively, the management system may determine that the credentials of the support user fail to satisfy one or more of the domain check, the VPN check, the role check, or the secure group check. In some implementations, the management system may enable additional checks to be performed for the credentials, such as checks defined by the support user, the organization super user, and/or the like.

As shown in FIG. 1B, and by reference number 125, the management system may deny the login request based on the credentials failing to satisfy one or more of the domain check, the VPN check, the role check, or the secure group check. For example, when the management system determines that the credentials fail to satisfy one or more of the domain check, the VPN check, the role check, or the secure group check, the management system may deny the login request of the support user. Denying the login request may prevent the user device of the support user from accessing the cloud computing environment. In some implementations, the management system may notify the support user (e.g., via the user device associated with the support user) that the login request is denied.

In some implementations, if the management system denies the login request, the support user may request approval of the login request from the organization super user. The management system may provide the request for approval of the login request to the user device associated with the organization super user, and the organization super user may determine whether to approve the login request. In some implementations, the organization super user may approve the login request, which may enable the user device of the support user to access the cloud computing environment. Alternatively, the organization super user may deny the login request, which may prevent the user device of the support user from accessing the cloud computing environment.

As further shown in FIG. 1B, and by reference number 130, the management system may provide the login request to an organization super user based on the credentials satisfying the domain check, the VPN check, the role check, and the secure group check. For example, when the management system determines that the credentials satisfy the domain check, the VPN check, the role check, and the secure group check, the management system may provide the login request (e.g., and the request for support) to the user device associated with the organization super user. The user device of the organization super user may display the login request and the request for support to the organization super user, and the organization super user may determine whether to approve the login request. In some implementations, the organization super user may approve the login request, which may enable the user device of the support user to access the cloud computing environment. Alternatively, the organization super user may deny the login request, which may prevent the user device of the support user from accessing the cloud computing environment.

As further shown in FIG. 1B, and by reference number 135, the management system may receive approval of the login request from the organization super user. For example, when the organization super user approves the login request, the user device of the organization super user may generate the approval of the login request and may provide the approval of the login request to the management system. The management system may receive the approval of the login request from the user device associated with the organization super user. In some implementations, the management system may determine whether to approve or deny the login request and may not request approval of the login request from the organization super user.

As shown in FIG. 1C, and by reference number 140, the management system may provide, to the support user, information for accessing the cloud computing environment based on receiving approval of the login request. For example, when the management system receives the approval of the login request from the organization super user, the management system may generate the information for accessing the cloud computing environment. The management system may provide the information for accessing the cloud computing environment to the user device associated with the support user. In some implementations, the information for accessing the cloud computing environment may include temporary credentials (e.g., a user ID, a password, and/or the like) that the support user may utilize to access the cloud computing environment. In some implementations, the management system may provide, to the user device associated with the support user, a user interface (e.g., a portal) that displays a list of cloud computing environments or cloud computing resources to which the support user temporarily has access. In such implementations, the user interface may indicate that the support user has access to the cloud computing environment. The support user may utilize the user device to select the cloud computing environment (or one or more cloud computing resources) from the list of cloud computing environments or cloud computing resources to which the support user temporarily has access.

As further shown in FIG. 1C, and by reference number 145, the support user may access the cloud computing environment with the information and may provide the support requested by the organization user. For example, the support user may utilize the information for accessing the cloud computing environment to access the cloud computing environment and to provide the support requested by the organization user. In some implementations, when providing the requested support, the support user may execute a specific set of commands in the cloud computing environment, may access a specific resource (e.g., a data center server, a network device, data center storage, and/or the like) of the cloud computing environment, may service the specific resource of the cloud computing environment, may instantiate a new resource in the cloud computing environment, and/or the like. In some implementations, when providing the requested support, the support user may perform a remote shell operation associated with the cloud computing environment. The remote shell operation may enable the support user to execute one or more commands on a remote resource of the cloud computing environment without actually logging into the remote resource. In some implementations, the support user may have time-limited access to the cloud computing environment based on approval of the login request. In some implementations, the management system may generate one or more audit entries associated with the support user and the time-limited access to the cloud computing environment.

As further shown in FIG. 1C, and by reference number 150, the management system may provide, to the organization super user, an indication that the support user is accessing the cloud computing environment and providing the support. For example, when the support user accesses the cloud computing environment, the management system may generate the indication (e.g., an instant message, an email message, and/or the like) that the support is accessing the cloud computing environment. The management system may provide the indication that the support user is accessing the cloud computing environment to the user device associated with the organization super user. The user device associated with organization super user may receive the indication from the management system and may display the indication to the organization super user.

As shown in FIG. 1D, and by reference number 155, the management system may receive, from the support user, an indication that the support is complete. For example, when the support user has completed the requested support for the organization user, the support user may utilize the user device of the support user to log out of the cloud computing environment. When the user device of the support user logs out of the cloud computing environment, the user device may generate the indication that the support is complete. The user device of the support user may provide the indication that the support is complete to the management system, and the management system may receive the indication that the support is complete from the user device of the support user. Alternatively, the management system may determine that the support user logging out of the cloud computing environment is the indication that the support is complete.

As further shown in FIG. 1D, and by reference number 160, the management system may provide, to the organization super user, the indication that the support is complete. For example, when the management system receives the indication that the support is complete, the management system may provide the indication that the support is complete to the user device associated with the organization super user. The organization super user may utilize the indication that the support is complete to review the support provided by the support user and to revoke the support user's access to the cloud computing environment. In some implementations, the indication that the support is complete may include a query as to whether the support user's access to the cloud computing environment should be revoked.

As further shown in FIG. 1D, and by reference number 165, the management system may receive, from the organization super user, a revocation request to revoke access to the cloud computing environment for the support user. When the organization super user receives the indication that the support is complete, the organization super user may cause the user device of the organization super user to generate the revocation request. The revocation request may include a request to revoke the support user's access to the cloud computing environment. The user device of the organization super user may provide the revocation request to the management system, and the management system may receive the revocation request from the user device of the organization super user.

As shown in FIG. 1E, and by reference number 170, the management system may revoke, based on the revocation request, access to the cloud computing environment for the support user. For example, when the management system receives the revocation request, the management system may revoke the support user's access to the cloud computing environment. The support user may no longer be able to access the cloud computing environment since the support requested by the organization user is complete.

In this way, the management system provides secure access to an organization for support and partner management. For example, the management system may provide a support user with access to an organization's cloud computing environment in a secure and efficient manner for managed partner support. The management system may enable the support user to temporarily provide support for a service associated with the organization. The management system may provide a complete audit trail of support users that access the cloud computing environment, and may provide a combination of integrated checks and workflow to ensure that access to the cloud computing environment is validated by the organization and appropriate for a support user. The management system may perform a check based on a combination of security features to prevent unauthorized access due to a role change. Thus, the management system conserves computing resources, networking resources, and/or the like that would otherwise have been consumed by providing bad actors with access to a cloud computing environment, incorrectly identifying a legitimate business reason for temporary access to the cloud computing environment, incorrectly providing temporary access to the cloud computing environment based on an illegitimate business reason, failing to provide an audit trail and additional security to the temporary access to the cloud computing environment, and/or the like.

Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
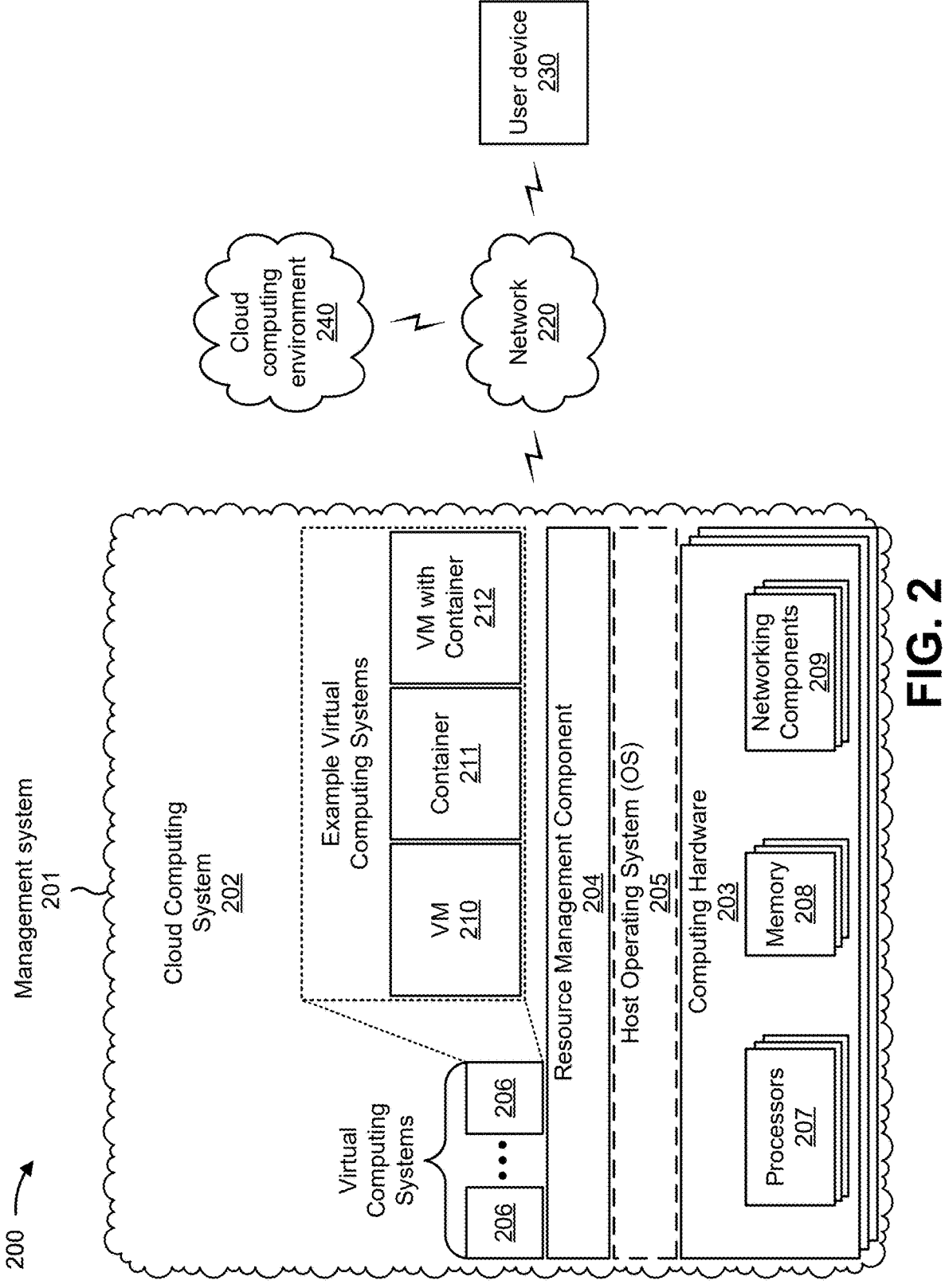
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a management system 201, which may include one or more elements of and/or may execute within a cloud computing system 202. The cloud computing system 202 may include one or more elements 203-212, as described in more detail below. As further shown in FIG. 2, the environment 200 may include a network 220, a user device 230, and/or a cloud computing environment 240. Devices and/or elements of the environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as the computing hardware 203) capable of virtualizing the computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using the computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the management system 201 may include one or more elements 203-212 of the cloud computing system 202, may execute within the cloud computing system 202, and/or may be hosted within the cloud computing system 202, in some implementations, the management system 201 may not be cloud-based (e.g., may be implemented outside of a cloud computing system) or may be partially cloud-based. For example, the management system 201 may include one or more devices that are not part of the cloud computing system 202, such as a device 300 of FIG. 3, which may include a standalone server or another type of computing device. The management system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The user device 230 may include one or more devices capable of receiving, generating, storing, processing, and/or providing information, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing environment 240 may include a network-based on-demand availability of computer system resources, such as data storage and computing power. The cloud computing environment may provide services according to different service models, including Infrastructure as a Service (IaaS), Platform as a Service (PaaS), and Software as a Service (SaaS). In some implementations, the cloud computing environment 240 may include one or more of the features described above in connection with the cloud computing system 202.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
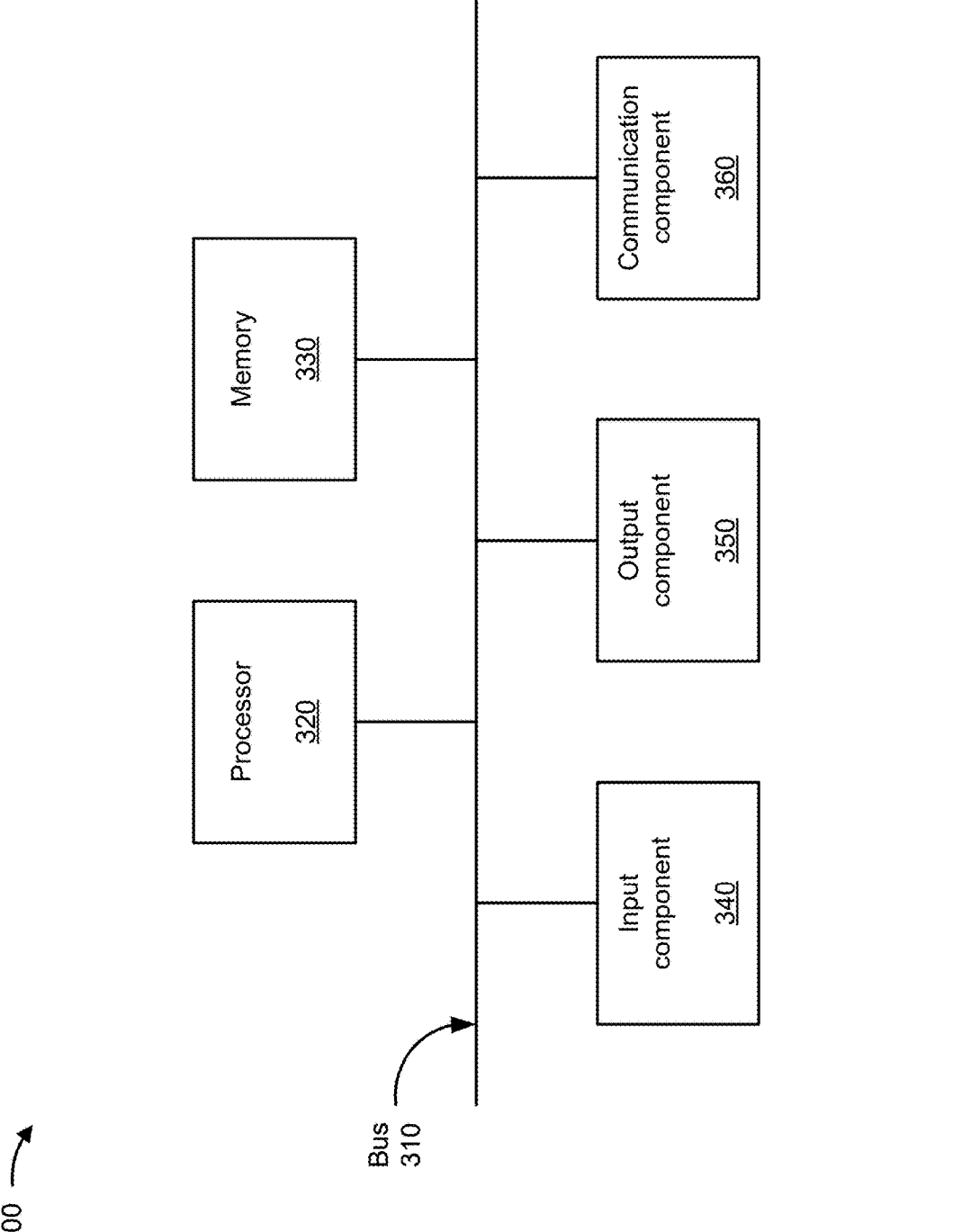
FIG. 3 is a diagram of example components of one or more devices of FIG. 2.

FIG. 3 is a diagram of example components of one or more devices of FIG. 2. The example components may be included in a device 300, which may correspond to the management system 201 and/or the user device 230. In some implementations, the management system 201 and/or the user device 230 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for providing secure access to an organization for support and partner management. In some implementations, one or more process blocks of FIG. 4 may be performed by a device (e.g., the management system 201). In some implementations, one or more process blocks of FIG. 4 may be performed by another device or a group of devices separate from or including the device, such as a user device (e.g., the user device 230). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from an organization user, a request for support associated with a cloud computing environment utilized by the organization user (block 410). For example, the device may receive, from an organization user, a request for support associated with a cloud computing environment utilized by the organization user, as described above. In some implementations, the support is associated with executing a set of commands or with accessing a specific resource. In some implementations, the request for support includes information identifying one or more of an identifier of an organization, a name of the organization, a target device identifier, or a cloud resource identifier. In some implementations, the cloud computing environment is associated with an organization that is associated with the organization user and an organization super user.

As further shown in FIG. 4, process 400 may include providing the request for support to a support user (block 420). For example, the device may provide the request for support to a support user, as described above.

As further shown in FIG. 4, process 400 may include receiving, from the support user, credentials of the support user and a login request to access the cloud computing environment (block 430). For example, the device may receive, from the support user, credentials of the support user and a login request to access the cloud computing environment, as described above.

As further shown in FIG. 4, process 400 may include determining whether the credentials of the support user satisfy a domain check, a VPN check, a role check, and a secure group check (block 440). For example, the device may determine whether the credentials of the support user satisfy a domain check, a VPN check, a role check, and a secure group check, as described above.

As further shown in FIG. 4, process 400 may include selectively denying the login request based on the credentials failing to satisfy one or more of the domain check, the VPN check, the role check, or the secure group check, or approving the login request based on the credentials satisfying the domain check, the VPN check, the role check, and the secure group check (block 450). For example, the device may selectively deny the login request based on the credentials failing to satisfy one or more of the domain check, the VPN check, the role check, or the secure group check, or approve the login request based on the credentials satisfying the domain check, the VPN check, the role check, and the secure group check, as described above. In some implementations, approving the login request includes providing the login request to an organization super user based on the credentials satisfying the domain check, the VPN check, the role check, and the secure group check; receiving approval of the login request from the organization super user; and approving the login request based on receiving the approval of the login request from the organization super user.

In some implementations, process 400 includes providing, to the support user, information for accessing the cloud computing environment based on approving the login request. In some implementations, process 400 includes providing, to an organization super user, an indication that the support user is accessing the cloud computing environment and providing the support.

In some implementations, process 400 includes enabling the support user to access the cloud computing environment and provide the support based on approving the login request, and receiving, from the support user, an indication that the support is complete. In some implementations, process 400 includes providing, to an organization super user, the indication that the support is complete; receiving, from the organization super user, a revocation request to revoke access to the cloud computing environment for the support user; and revoking, based on the revocation request, access to the cloud computing environment for the support user.

In some implementations, process 400 includes providing, to the support user, time-limited access to the cloud computing environment based on approving the login request. In some implementations, process 400 includes generating an audit entry associated with the support user and the time-limited access to the cloud computing environment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device and from an organization user, a request for support associated with a cloud computing environment utilized by the organization user;

providing, by the device, the request for support to a support user;

receiving, by the device and from the support user, credentials of the support user and a login request to access the cloud computing environment;

determining, by the device, whether the credentials of the support user satisfy a domain check, a virtual private network (VPN) check, a role check, and a secure group check, wherein the domain check is performed based at least in part on an email address of the support user and wherein the secure group check is performed based at least in part on whether a secure group associated with the support user has approval to access the cloud computing environment; and selectively:

denying, by the device, the login request based on the credentials failing to satisfy one or more of the domain check, the VPN check, the role check, or the secure group check; or approving, by the device, the login request based on the credentials satisfying the domain check, the VPN check, the role check, and the secure group check.

2. The method of claim 1,
wherein approving the login request comprises:
    providing the login request to an organization super user based on the credentials satisfying the domain check, the VPN check, the role check, and the secure group check;
    receiving approval of the login request from the organization super user; and
    approving the login request based on receiving the approval of the login request from the organization super user.

3. The method of claim 1, further comprising:
providing, to the support user, information for accessing the cloud computing environment based on approving the login request.

4. The method of claim 3, further comprising:
providing, to an organization super user, an indication that the support user is accessing the cloud computing environment and providing the support.

5. The method of claim 1,
wherein the support is associated with executing a set of commands or with accessing a specific resource.

6. The method of claim 1, further comprising:
enabling the support user to access the cloud computing environment and provide the support based on approving the login request; and
receiving, from the support user, an indication that the support is complete.

7. The method of claim 6, further comprising:
providing, to an organization super user, the indication that the support is complete;
receiving, from the organization super user, a revocation request to revoke access to the cloud computing environment for the support user; and
revoking, based on the revocation request, access to the cloud computing environment for the support user.

8. A device, comprising:
one or more memories; and
one or more processors to:
    receive, from an organization user, a request for support associated with a cloud computing environment utilized by the organization user;
    provide the request for support to a support user;
    receive, from the support user, credentials of the support user and a login request to access the cloud computing environment;
    determine whether the credentials of the support user satisfy a domain check, a virtual private network (VPN) check, a role check, and a secure group check, wherein the domain check is performed based at least in part on an email address of the support user and wherein the secure group check is performed based at least in part on whether a secure group associated with the support user has approval to access the cloud computing environment; and
    selectively:
        deny the login request and access of the support user to the cloud computing environment based on the credentials failing to satisfy one or more of the domain check, the VPN check, the role check, or the secure group check; or
        approve the login request based on the credentials satisfying the domain check, the VPN check, the role check, and the secure group check.

9. The device of claim 8,
wherein the one or more processors are further to:

provide, to the support user, time-limited access to the cloud computing environment based on approving the login request.

10. The device of claim 9,
wherein the one or more processors are further to:
    generate an audit entry associated with the support user and the time-limited access to the cloud computing environment.

11. The device of claim 8,
wherein the support is associated with executing a set of commands or with accessing a specific resource.

12. The device of claim 8,
wherein the request for support includes information identifying one or more of an identifier of an organization, a name of the organization, a target device identifier, or a cloud resource identifier.

13. The device of claim 8,
wherein the cloud computing environment is associated with an organization that is associated with the organization user and an organization super user.

14. The device of claim 8,
wherein the one or more processors are further to:
    deny the support user access to the cloud computing environment based on denying the login request.

15. A non-transitory computer-readable medium storing a set of instructions, the set of instructions comprising:
one or more instructions that, when executed by one or more processors of a device, cause the device to:
    receive, from an organization user, a request for support associated with a cloud computing environment utilized by the organization user,
        wherein the request for support includes information identifying one or more of an identifier of an organization, a name of the organization, a target device identifier, or a cloud resource identifier;
    provide the request for support to a support user;
    receive, from the support user, credentials of the support user and a login request to access the cloud computing environment;
    determine whether the credentials of the support user satisfy a domain check, a virtual private network (VPN) check, a role check, and a secure group check, wherein the domain check is performed based at least in part on an email address of the support user and wherein the secure group check is performed based at least in part on whether a secure group associated with the support user has approval to access the cloud computing environment; and
    selectively:
        deny the login request based on the credentials failing to satisfy one or more of the domain check, the VPN check, the role check, or the secure group check; or
        approve the login request based on the credentials satisfying the domain check, the VPN check, the role check, and the secure group check.

16. The non-transitory computer-readable medium of claim 15,
wherein the one or more instructions, that cause the device to approve the login request, cause the device to:
    provide the login request to an organization super user based on the credentials satisfying the domain check, the VPN check, the role check, and the secure group check;
    receive approval of the login request from the organization super user; and approve the login request based on receiving the approval of the login request from the organization super user.

17. The non-transitory computer-readable medium of claim 15, wherein the one or more instructions further cause the device to:

provide, to the support user, information for accessing the cloud computing environment based on approving the login request; and provide, to an organization super user, an indication that the support user is accessing the cloud computing environment and providing the support.

18. The non-transitory computer-readable medium of claim 15, wherein the one or more instructions further cause the device to:

enable the support user to access the cloud computing environment and provide the support based on approving the login request; and receive, from the support user, an indication that the support is complete.

19. The non-transitory computer-readable medium of claim 18, wherein the one or more instructions further cause the device to:

provide, to an organization super user, the indication that the support is complete;

receive, from the organization super user, a revocation request to revoke access to the cloud computing environment for the support user; and revoke, based on the revocation request, access to the cloud computing environment for the support user.

20. The non-transitory computer-readable medium of claim 15, wherein the one or more instructions further cause the device to:

provide, to the support user, time-limited access to the cloud computing environment based on approving the login request.

* * * * *